(12) United States Patent
Shimizu et al.

(10) Patent No.: US 10,705,416 B2
(45) Date of Patent: Jul. 7, 2020

(54) WAVELENGTH CONVERSION ELEMENT, LIGHT SOURCE APPARATUS, AND PROJECTOR

(71) Applicant: SEIKO EPSON CORPORATION, Tokyo (JP)

(72) Inventors: Tetsuo Shimizu, Matsumoto (JP); Akira Egawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/364,267

(22) Filed: Mar. 26, 2019

(65) Prior Publication Data

US 2019/0302587 A1 Oct. 3, 2019

(30) Foreign Application Priority Data

Mar. 27, 2018 (JP) .................................. 2018-059826

(51) Int. Cl.
| | |
|---|---|
| *G03B 21/14* | (2006.01) |
| *G02B 26/00* | (2006.01) |
| *G03B 21/20* | (2006.01) |
| *G02B 27/14* | (2006.01) |
| *G02B 5/02* | (2006.01) |
| *G03B 21/00* | (2006.01) |

(52) U.S. Cl.
CPC ......... *G03B 21/204* (2013.01); *G02B 5/0278* (2013.01); *G02B 26/008* (2013.01); *G02B 27/149* (2013.01); *G03B 21/006* (2013.01)

(58) Field of Classification Search
CPC .... G03B 21/204; G03B 21/14; G03B 21/006; G02B 26/008
See application file for complete search history.

(56) References Cited

U.S. PATENT DOCUMENTS

| | | | |
|---|---|---|---|
| 2009/0284148 A1 | 11/2009 | Iwanaga | |
| 2016/0274353 A1* | 9/2016 | Ando | C09K 11/02 |
| 2019/0072243 A1* | 3/2019 | Egawa | F21V 9/40 |
| 2019/0155134 A1* | 5/2019 | Komatsu | F21S 2/00 |
| 2019/0187543 A1* | 6/2019 | Watanabe | H04N 9/3161 |

FOREIGN PATENT DOCUMENTS

| | | |
|---|---|---|
| JP | 2009-277516 A | 11/2009 |
| JP | 2016-062012 A | 4/2016 |

* cited by examiner

*Primary Examiner* — William C. Dowling
(74) *Attorney, Agent, or Firm* — Oliff PLC

(57) ABSTRACT

A wavelength conversion element according to an aspect of the invention includes a first wavelength conversion layer that has a first light incident surface on which excitation light is incident and a first light exiting surface facing away from the first light incident surface and emits first fluorescence, a second wavelength conversion layer that has a second light incident surface on which at least the first fluorescence is incident and emits second fluorescence, and a substrate that has a first surface and a second surface facing away from the first surface and includes a light transmitting portion that transmits at least the first fluorescence. The first wavelength conversion layer is so provided that the first light exiting surface faces the first surface of the substrate, and the second wavelength conversion layer is so provided that the second light incident surface faces the second surface of the substrate.

20 Claims, 3 Drawing Sheets

WAVELENGTH CONVERSION ELEMENT, LIGHT SOURCE APPARATUS, AND PROJECTOR

BACKGROUND

1. Technical Field

The present invention relates to a wavelength conversion element, a light source apparatus, and a projector.

2. Related Art

As a light source apparatus used in a projector, there has been a proposed light source apparatus using fluorescence emitted from a phosphor irradiated with excitation light outputted from a light emitting device, such as a semiconductor laser. In a light source apparatus of this type, however, the wavelength band to which the fluorescence belongs is determined by the phosphor material to be used. Therefore, fluorescence having a desired color tone is not produced in some cases. To solve the problem, there has been a proposed light source apparatus including a plurality of types of phosphor material that emit light fluxes that belong to wavelength bands different from one another.

For example, JP-A-2016-062012 discloses a light source apparatus including a red light source apparatus, a blue light source apparatus, and a green light source apparatus that includes a phosphor plate having a green phosphor layer and a cyan phosphor layer layered on one surface of a substrate. JP-A-2016-062012 describes that in the light source apparatus, fluorescence that belongs to the cyan wavelength band can adjust the color tone of fluorescence that belongs to the green wavelength band to a color tone shifted toward the shorter wavelength side.

In the light source apparatus described in JP-A-2016-062012, the two phosphor layers that emit light fluxes that belong to wavelength bands different from each other are layered on one surface of the substrate. Therefore, heat dissipation from the two phosphor layers is insufficient, resulting in a decrease in the wavelength conversion efficiency of each of the phosphor layers, and the color gamut of the light outputted from the light source apparatus could therefore change. The light source apparatus cannot therefore undesirably output light having a desired color gamut in a stable manner.

SUMMARY

An advantage of some aspects of the invention is to provide a wavelength conversion element capable of stably outputting light having a desired color gamut. Another advantage of some aspects of the invention is to provide a light source apparatus including the wavelength conversion element described above. Another advantage of some aspects of the invention is to provide a projector including the light source apparatus described above.

A wavelength conversion element according to an aspect of the invention includes a first wavelength conversion layer that has a first light incident surface on which excitation light that belongs to a first wavelength band is incident and a first light exiting surface facing away from the first light incident surface and emits first fluorescence that belongs to a second wavelength band different from the first wavelength band, a second wavelength conversion layer that has a second light incident surface on which at least the first fluorescence is incident and emits second fluorescence that belongs to a third wavelength band different from the first and second wavelength bands, and a substrate that has a first surface and a second surface facing away from the first surface and includes a light transmitting portion that transmits at least the first fluorescence. The first wavelength conversion layer is so provided that the first light exiting surface faces the first surface of the substrate, and the second wavelength conversion layer is so provided that the second light incident surface faces the second surface of the substrate.

In the wavelength conversion element according to the aspect of the invention, a wavelength conversion efficiency of the second wavelength conversion layer may be lower than a wavelength conversion efficiency of the first wavelength conversion layer.

In the wavelength conversion element according to the aspect of the invention, an amount of the second fluorescence emitted from the second wavelength conversion layer may be greater than an amount of the first fluorescence emitted from the first wavelength conversion layer.

In the wavelength conversion element according to the aspect of the invention, a first air layer may be provided between the first light exiting surface of the first wavelength conversion layer, which is the surface opposite the first light incident surface thereof, and the first surface of the substrate.

In the wavelength conversion element according to the aspect of the invention, a second air layer may be provided between the second light incident surface of the second wavelength conversion layer and the second surface of the substrate.

A light source apparatus according to another aspect of the invention includes the wavelength conversion element according to the aspect of the invention described above and a light source that outputs the excitation light toward the wavelength conversion element.

A projector according to another aspect of the invention includes the light source apparatus according to the aspect of the invention described above, a light modulator that modulates light from the light source apparatus in accordance with image information to form image light, and a projection optical apparatus that projects the image light.

In the projector according to the aspect of the invention described above, the first or second surface of the substrate corresponding to the light transmitting portion may have a light diffusing surface that diffuses the excitation light, the first fluorescence, or the second fluorescence.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below with reference to FIGS. 1 to 4.

In the following drawings, components are drawn at different dimensional scales in some cases for clarity of each of the components.

Figure 1:
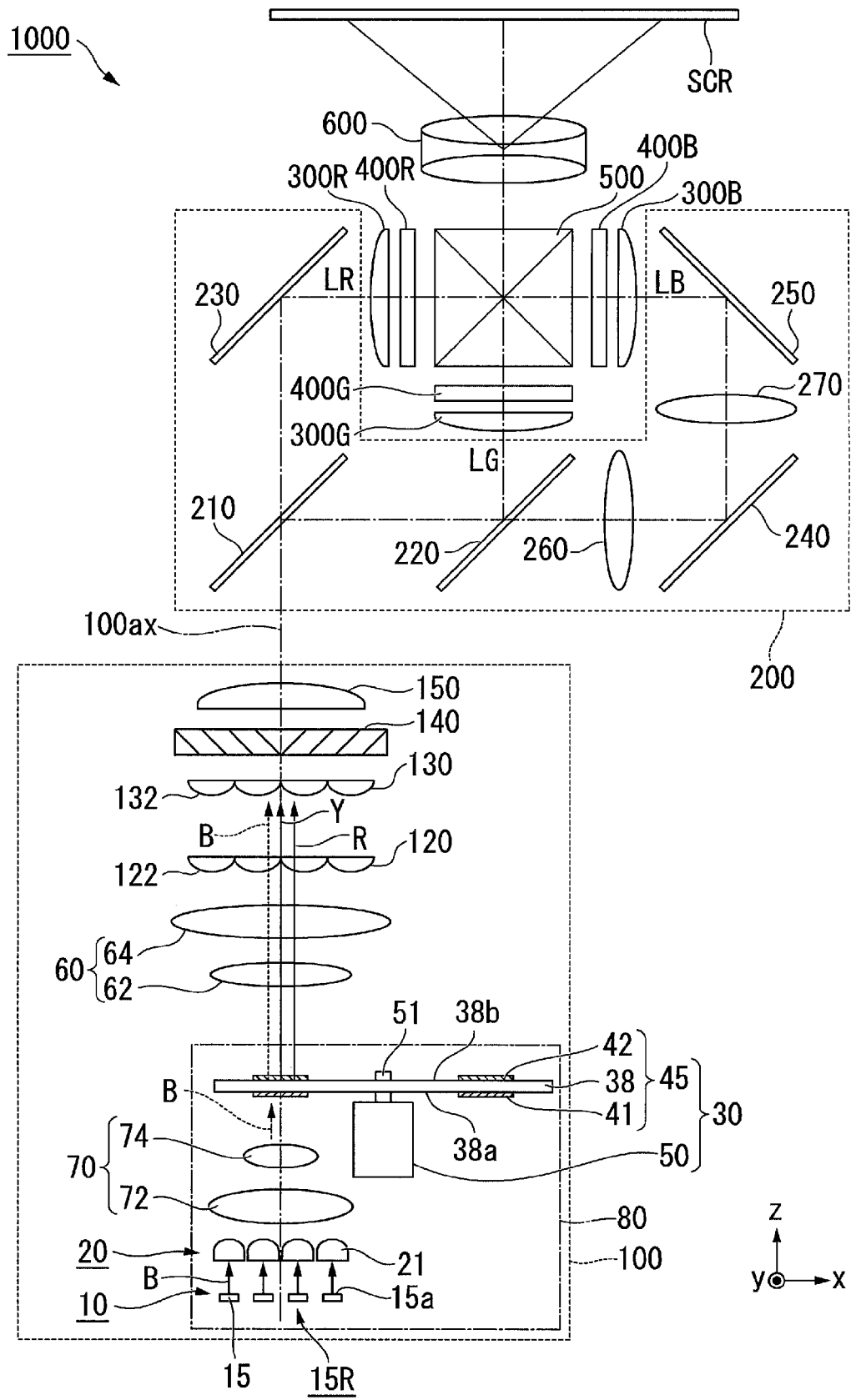
FIG. 1 is a schematic configuration diagram of a projector according to a first embodiment.

FIG. 1 is a schematic configuration diagram of a projector 1000 according to the present embodiment.

The projector 1000 includes an illuminator 100, a color separation/light guide system 200, a light modulator 400R, a light modulator 400G, a light modulator 400B, a cross dichroic prism 500, and a projection optical apparatus 600, as shown in FIG. 1.

The illuminator 100 includes a light source apparatus 80, a pickup system 60, a first lens array 120, a second lens array 130, a polarization conversion element 140, and a superimposing lens 150. The light source apparatus 80 includes a light source 10, a collimation system 20, a light collection system 70, and a wavelength converter 30. The light source apparatus 80 includes a light source 10, a collimation system 20, a light collection system 70, and a wavelength conversion element 30.

The light source 10 emits blue light B. Although will be described later in detail, the wavelength converter 30 converts part of the blue light B outputted from the light source 10 into yellow fluorescence Y and red fluorescence R and outputs the yellow fluorescence Y and red fluorescence R along with the remainder of the blue light B. The light source apparatus 80 thus outputs white light as a whole.

The light source 10 includes a plurality of semiconductor lasers 15. The semiconductor lasers 15 each emit blue light B that belongs to a first wavelength band having, for example a peak wavelength of 455 nm at which the intensity of the blue light B peaks. The first wavelength band ranges, for example, from 450 to 480 nm. The semiconductor lasers 15 may instead each emit blue light B having a peak wavelength other than 455 nm, for example, blue light B having a peak wavelength of 462 nm. The semiconductor lasers 15 do not necessarily each emit the blue light B and may instead each emit ultraviolet light. The light source 10 does not necessarily include the semiconductor lasers 15 and may instead include solid-state light sources, such as light emitting diodes.

The following description uses an orthogonal coordinate system in which the direction of the principal ray of the blue light B is a direction z and the directions perpendicular to each other in a plane perpendicular to the direction z are directions x and y.

The plurality of semiconductor lasers are arranged in a two-dimensional array with the semiconductor lasers separate from each other by a predetermined distance in the directions x and y.

In the present embodiment, the plurality of semiconductor lasers 15 are arranged in an array formed of four rows and four columns in an xy plane. That is, the array of the plurality of semiconductor lasers 15 has four semiconductor laser columns 15R arranged in the direction x. The semiconductor laser columns 15R each have four semiconductor lasers 15 arranged in the direction y. The number of semiconductor lasers 15 is, however, not limited to a specific number.

The semiconductor lasers 15 each have a light exiting surface 15a, through which the light is emitted. The light exiting surface 15a has a roughly rectangular shape having a longitudinal direction and a lateral direction in a plan view viewed in the direction z. In the present embodiment, the longitudinal direction of the light exiting surface is parallel to the direction x, and the lateral direction of the light exiting surface is parallel to the direction y.

The blue light B outputted from each of the semiconductor lasers 15 is formed of linearly polarized light, for example, having a polarization direction parallel to the longitudinal direction of the light exiting surface. The angle of divergence of the blue light B in the lateral direction of the light exiting surface is greater than the angle of divergence of the blue light B in the longitudinal direction of the light exiting surface. The cross-sectional shape of the blue light B in an xy plane is therefore an elliptical shape having a longitudinal direction that coincides with the direction y and a lateral direction that coincides with the direction x.

Although not shown in FIG. 1, the semiconductor lasers 15 are mounted on a base substrate. The base substrate is desirably made of a metal having high thermal conductivity, such as copper, to effectively dissipate heat generated by the semiconductor lasers 15. The semiconductor lasers 15 may instead be mounted on the base substrate via a sub-mount. Further, a heat sink or any other cooler may be provided on a surface of the base substrate that is the surface opposite the semiconductor laser mounting surface.

The collimation system 20 includes a plurality of collimator lenses 21 arranged in a two-dimensional array in correspondence with the arrangement of the plurality of semiconductor lasers 15. The collimator lenses 21 are each formed of a convex lens. The light beam flux emitted from each of the plurality of semiconductor lasers 15 is parallelized when passing through the corresponding one of the plurality of collimator lenses 21, which form the collimation system 20.

The light collection system 70 collects the blue light B having exited out of the collimation system 20 and causes the collected blue light B to enter a wavelength conversion element 45. The light collection system 70 includes a first lens 72 and a second lens 74. The first lens 72 and the second lens 74 are each formed of a convex lens.

Figure 2:
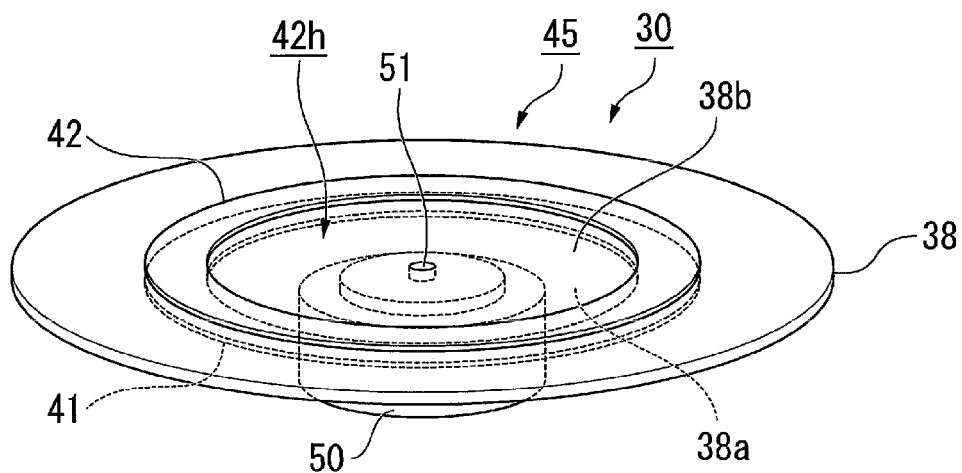
FIG. 2 is a perspective view of a wavelength converter in the first embodiment.
Figure 3:
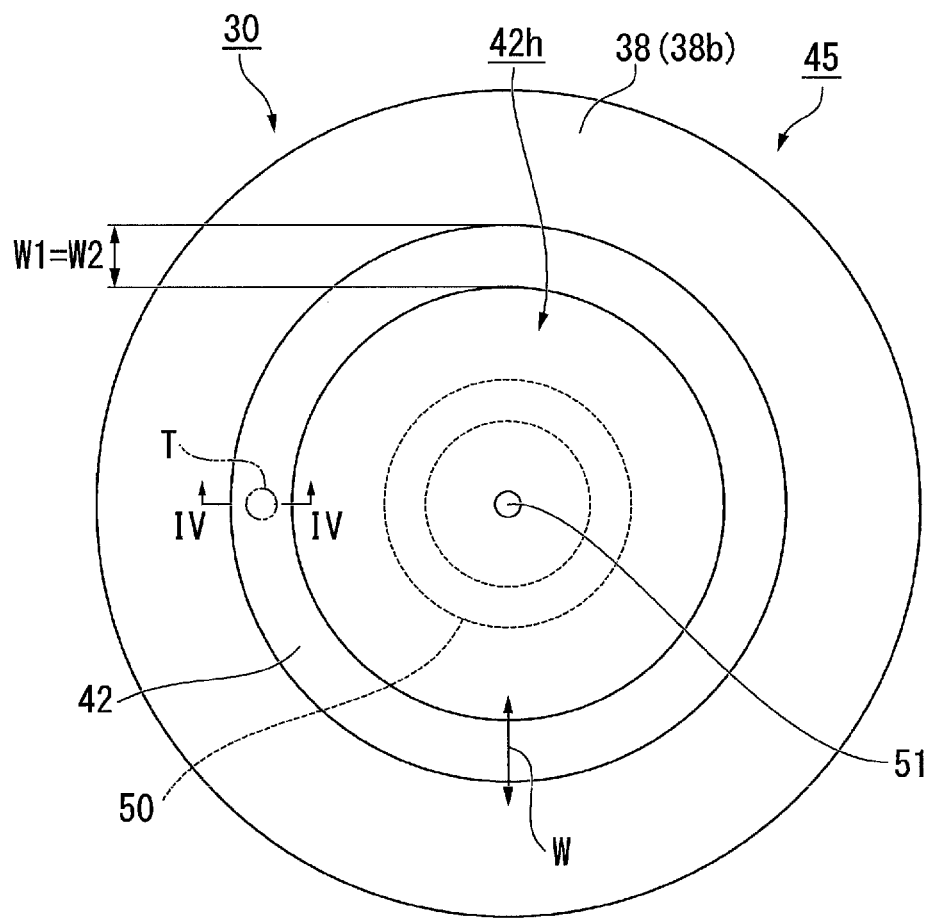
FIG. 3 is a plan view of the wavelength converter.
Figure 4:
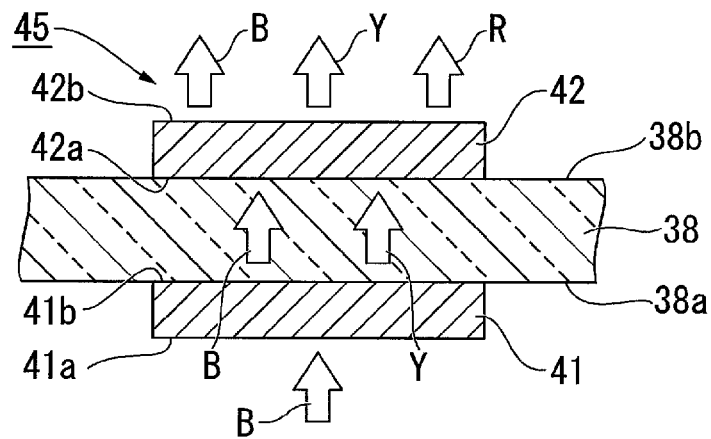
FIG. 4 is a cross-sectional view of a wavelength conversion element taken along the line IV-IV in FIG. 3.

FIG. 2 is a perspective view of the wavelength converter 30 in the present embodiment. FIG. 3 is a plan view of the wavelength converter 30 viewed from the light exiting side. FIG. 4 is a cross-sectional view of the wavelength conversion element 45 taken along the line IV-IV in FIG. 3.

The wavelength converter 30 includes the wavelength conversion element 45 and a motor 50, which rotates the wavelength conversion element 45, as shown in FIGS. 2 to 4. The wavelength conversion element 45 includes a substrate 38, a first phosphor layer 41, and a second phosphor layer 42. The wavelength converter 30 outputs the white light W toward the side opposite the side on which the blue light B is incident. That is, the wavelength conversion element 45 provided in the wavelength converter 30 is a transmissive wavelength conversion element.

The substrate 38 rotates around a rotary shaft 51 when the motor 50 is driven. The substrate 38 has a circular shape when the wavelength conversion element 45 is viewed in the direction in which the rotary shaft 51 extends (direction z). The substrate 38 is made of a material that transmits the blue light B and first fluorescence Y, which will be described later. The material of the substrate 38 can, for example, be optical glass, quartz glass, sapphire glass, crystallized quartz, or transparent resin. Reflection suppression layer may be provided on at least one of a first surface 38a and a second surface 38b of the substrate 38.

Since the blue light B formed of laser beams is incident on the wavelength conversion element 45, heat is generated in the first phosphor layer 41 and the second phosphor layer 42. In the present embodiment, rotating the wavelength conversion element 45 with the motor 50 allows the position where the blue light B is incident on the first phosphor layer 41 and the second phosphor layer 42 to change over time. The rotation of the wavelength conversion element 45 avoids a situation in which the blue light B keeps impinging on the same position on the first phosphor layer 41 and the second phosphor layer 42 so that the first phosphor layer 41 and the second phosphor layer 42 are locally heated. In FIG. 3, the circle labeled with the reference character T represents the position on which the blue light B is incident.

The first phosphor layer 41 and the second phosphor layer 42 each have a circular-ring-like shape having an opening 42h around the axis of rotation 51, as shown in FIG. 3. That is, the first phosphor layer 41 is so provided on the first surface 38a of the substrate 38 as to surround the axis of rotation 51. The second phosphor layer 42 is so provided on the second surface 38b of the substrate 38 as to surround the axis of rotation 51. The width W1 of the first phosphor layer 41 in the radial direction of the substrate 38 is roughly equal to the width W2 of the second phosphor layer 42 in the radial direction. Therefore, when the wavelength conversion element 45 is viewed in the direction in which the axis of rotation 51 (direction z), the outer shape of the first phosphor layer 41 roughly coincides with the outer shape of the second phosphor layer 42.

The first phosphor layer 41 has a first light incident surface 41a, on which the blue light B (excitation light) is incident, which belongs to the first wavelength band, and a first light exiting surface 41b, through which the first fluorescence Y, which belongs to a second wavelength band different from the first wavelength band, and the blue light B that has not been used to excite the first phosphor layer 41 exit, as shown in FIG. 4. The first phosphor layer 41 is so provided that the first light exiting surface 41b faces the first surface 38a of the substrate 38. In the present embodiment, the second wavelength band to which the first fluorescence Y belongs ranges, for example, from about 480 to 700 nm (peak wavelength is about 540 nm), and the first fluorescence Y emitted from the first phosphor layer 41 is yellow light.

The first phosphor layer 41 is formed, for example, of a YAG-based phosphor made of $(Y_{1-x}, Gd_x)_3(Al, Ga)_5O_{12}$ ($0 \leq x \leq 1$), in which Ce is dispersed as an activator (Ce:YAG). The yellow phosphor may be formed of the Ce:YAG phosphor in the form of bulk or may be formed of phosphor particles formed of the Ce:YAG phosphor and a binder.

The second phosphor layer 42 emits second fluorescence R, which belongs to a third wavelength band different from the first and second wavelength bands. The second phosphor layer 42 has a second light incident surface 42a, on which at least the first fluorescence Y is incident. In the present embodiment, the second phosphor layer 42 has the second light incident surface 42a, on which the blue light B and the first fluorescence Y are incident, and a second light exiting surface 42b, through which the blue light B, the first fluorescence Y, and the second fluorescence R exit. The second phosphor layer 42 is so provided that the second light incident surface 42a faces the second surface 38b of the substrate 38. In the present embodiment, the third wavelength band ranges, for example, from about 500 to 800 nm (peak wavelength is about 610 nm), and the second fluorescence R emitted from the second phosphor layer 42 is red light.

The second phosphor layer 42 is formed of a YAG-based phosphor made, for example, of $(Y_{1-x}, Gd_x)_3(Al, Ga)_5O_{12}$ in which any of Pr, Eu, and Cr is dispersed as an activator (any of Pr:YAG, Eu:YAG, and Cr:YAG). The activator may be one type selected from Pr, Eu, and Cr or may be a co-activator containing a plurality of types selected from Pr, Eu, and Cr. The red phosphor may be formed of the phosphor described above in the form of bulk or may be formed of phosphor particles made of the phosphor described above and a binder, as in the case of the yellow phosphor.

The first phosphor layer 41 and the second phosphor layer 42 are so provided that the first light exiting surface 41b and the second light incident surface 42a face each other with the substrate 38 interposed therebetween. In the present embodiment, the substrate 38 is made entirely of a light transmissive material that transmits the blue light B and the first fluorescence Y, such as quartz glass, and the entire area of the substrate 38 functions as a light transmitting portion that transmits the blue light B and the first fluorescence Y. In place of the configuration in the present embodiment, out of the entire area of the substrate 38, only the area where the first phosphor layer 41 and the second phosphor layer 42 face each other may be made of a light transmissive material that transmits the blue light B and the first fluorescence Y, and only the area may function as the light transmitting portion.

The wavelength conversion efficiency of the second phosphor layer 42, which emits the second fluorescence R, which is red fluorescence, is lower than the wavelength conversion efficiency of the first phosphor layer 41, which emits the first fluorescence Y, which is yellow fluorescence.

In the wavelength conversion element 45, part of the blue light B having entered the first phosphor layer 41 as the excitation light is converted in terms of wavelength by the first phosphor layer 41 into the first fluorescence Y. The remainder of the blue light B passes through the first phosphor layer 41. The remainder of the blue light B and the first fluorescence Y thus exit out of the first phosphor layer 41. Part of the blue light B having entered the second phosphor layer 42 as the excitation light is converted in terms of wavelength by the second phosphor layer 42 into the second fluorescence R. The remainder of the blue light B and the first fluorescence Y pass through the second phosphor layer 42. The remainder of the blue light B, the first fluorescence Y, and the second fluorescence R thus exit out of the second phosphor layer 42.

The pickup system 60 includes a first pickup lens 62 and a second pickup lens 64, as shown in FIG. 1. The pickup system 60 roughly parallelizes the light having exited out of the wavelength conversion element 30 and outputs the resultant light toward the downstream optical system. The first pickup lens 62 and the second pickup lens 64 are each formed of a convex lens.

The first lens array 120 includes a plurality of first lenses 122. The first lens array 120 divides the light having exited out of the pickup system 60 into a plurality of sub-light fluxes. The plurality of first lenses 122 are arranged in a matrix in a plane perpendicular to an illumination optical axis 100ax.

The second lens array 130 includes a plurality of second lenses 132 corresponding to the plurality of first lenses 122 of the first lens array 120. The second lens array 130, along with the superimposing lens 150, forms images of the first lenses 122 of the first lens array 120 in the vicinity of image formation areas of the light modulators 400R, 400G, and 400B. The plurality of second lenses 132 are arranged in a matrix in a plane perpendicular to the illumination optical axis 100ax.

The polarization conversion element 140 converts each of the plurality of divided sub-light fluxes from the first lens array 120 into linearly polarized light. The polarization conversion element 140 has polarization separation layers that directly transmit one linearly polarized light component of the polarized light components contained in the light having exited out of the wavelength conversion element 30 and reflects another linearly polarized light component in the direction perpendicular to the illumination optical axis 100ax, reflection layers that reflect the other linearly polarized light component reflected off the polarization separation layers in the direction parallel to the illumination optical axis 100ax, and retardation films that convert the other linearly polarized light component reflected off the reflection layers into the one linearly polarized light component.

The superimposing lens 150 superimposes the plurality of sub-light fluxes having exited out of the polarization conversion element 140 on one another in the vicinity of the image formation areas of the light modulators 400R, 400G, and 400B. The first lens array 120, the second lens array 130, and the superimposing lens 150 form an optical integration system that homogenizes the intensity distribution of the light from the wavelength conversion element 30 in the image formation areas.

The color separation/light guide system 200 includes dichroic mirrors 210 and 220, reflection mirrors 230, 240, and 250, and relay lenses 260 and 270. The color separation/light guide system 200 separates the light outputted from the illuminator 100 into red light LR, green light LG, and blue light LB and guides the red light LR, the green light LG, and the blue light LB to the corresponding light modulators 400R, 400G, and 400B.

A light collection lens 300R is disposed between the color separation/light guide system 200 and the light modulator 400R. A light collection lens 300G is disposed between the color separation/light guide system 200 and the light modulator 400G. A light collection lens 300B is disposed between the color separation/light guide system 200 and the light modulator 400B.

The dichroic mirror 210 transmits the red light component and reflects the green light component and the blue light component. The dichroic mirror 220 reflects the green light component and transmits the blue light component.

The red light LR having passed through the dichroic mirror 210 is reflected off the reflection mirror 230, passes through the light collection lens 300R, and is incident on the image formation area of the light modulator 400R for red light. The green light LG reflected off the dichroic mirror 210 is further reflected off the dichroic mirror 220, passes through the light collection lens 300G, and is incident on the image formation area of the light modulator 400G for green light. The blue light LB having passed through the dichroic mirror 220 travels via the relay lens 260, the reflection mirror 240, the relay lens 270, the reflection mirror 250, and the light collection lens 300B and is incident on the image formation area of the light modulator 400B for blue light.

The light modulators 400R, 400G, and 400B modulate the color light fluxes incident thereon in accordance with image information to form image light fluxes. The light modulators 400R, 400G, and 400 are each formed of a transmissive liquid crystal panel. Although not shown, light-incident-side polarizers are disposed between the light collection lens 300R and the light modulator 400R, between the light collection lens 300G and the light modulator 400G, and between the light collection lens 300B and the light modulator 400B. Light-exiting-side polarizers are disposed between the light modulators 400R, 400G, 400B and the cross dichroic prism 500.

The cross dichroic prism 500 combines the image light fluxes outputted from the light modulators 400R, 400G, and 400B with one another. The cross dichroic prism 500 has a configuration in which four right-angle prisms are bonded to each other. Dielectric multilayer films are formed on the roughly X-letter-shaped interfaces between the bonded right-angle prisms.

The color image having exited out of the cross dichroic prism 500 is enlarged and projected by the projection optical apparatus 600 and forms an image on a screen SCR.

To adjust the color tone of emitted fluorescence, a wavelength conversion element made of a plurality of types of phosphor materials that emit light fluxes that belong to different emitted light wavelength bands has been proposed. In the wavelength conversion element of related art, however, two phosphor layers that emit light fluxes that belong to different wavelength bands are layered on one surface of a substrate, and heat generated in the phosphor layer that is not in direct contact with the substrate is transferred to the substrate via the phosphor layer that is indirect contact with the substrate. Therefore, heat dissipation from the phosphor layer that is not in direct contact with the substrate is particularly insufficient, resulting in a decrease in the wavelength conversion efficiency of the phosphor layer, and the color gamut of the light outputted from the light source apparatus could therefore change.

To avoid the problem, in the wavelength conversion element 45 according to the present embodiment, the two phosphor layers 41 and 42 are not layered on one surface of the substrate 38, but the first phosphor layer 41 is so provided as to face the first surface 38a of the substrate 38, and the second phosphor layer 42 is so provided as to face the second surface 38b of the substrate 38. Therefore, in the wavelength conversion element 45, the heat generated in each of the phosphor layers 41 and 42 is more likely to be transferred to the substrate 38 than in the wavelength conversion element of related art. The thus configured wavelength conversion element 45 can suppress a decrease in the wavelength conversion efficiency in each of the phosphor layers 41 and 42 and can therefore stably emit light having a desired color gamut.

Further, in the wavelength conversion element 45 according to the present embodiment, not only are the phosphor layers 41 and 42 provided on the surfaces 38a and 38b of the substrate 38, respectively, but the first phosphor layer 41 is provided on the first surface 38a of the substrate 38 (side on which blue light B is incident) and second phosphor layer 42 is provided on the second surface 38b of the substrate 38 (side via which blue light B exits), whereby the following actions and effects are provided.

In a phosphor layer, a large amount of heat is generated in the vicinity of the excitation light incident surface. In a case where excitation light fluxes having the same intensity are incident on two phosphor layers having different wavelength conversion efficiencies, heat generated in the phosphor layer having a relatively low wavelength conversion efficiency is greater than heat generated in the phosphor layer having a relatively high wavelength conversion efficiency.

In the wavelength conversion element 45 according to the present embodiment, in which the wavelength conversion efficiency of the second phosphor layer 42 is lower than the wavelength conversion efficiency of the first phosphor layer 41, the largest amount of heat is generated in the vicinity of the second light incident surface 42a of the second phosphor layer 42. However, since the second light incident surface 42a of the second phosphor layer 42 is in contact with the second surface 38b of the substrate 38, the distance from the location where the heat is generated to the substrate 38 is short, and a large amount of heat generated in the vicinity of the second light incident surface 42a of the second phosphor layer 42 is likely to be transferred to the substrate 38. Therefore, the wavelength conversion element 45 according to the present embodiment can suppress a decrease in the overall wavelength conversion efficiency of the two phosphor layers 41 and 42 and stably emit white light having a desired color gamut.

As described above, the wavelength conversion element 45 according to the present embodiment can add a red tone of the second fluorescence R from the second phosphor layer 42 to the color tone of the first fluorescence Y from the first phosphor layer 41 made of a yellow phosphor material typically having an insufficient amount of red light component.

The light source apparatus 80 according to the present embodiment, which includes the wavelength conversion element 45 capable of suppressing the wavelength conversion efficiency in each of the phosphor layers 41 and 42, can stably emit white light having a desired color gamut.

The projector 1000 according to the present embodiment, which includes the light source apparatus 80 capable of stably emitting white light having a desired color gamut, can display a high-luminance, wide-color-gamut image.

Second Embodiment

A second embodiment of the invention will be described below with reference to FIG. 5.

The configurations of a projector and a light source apparatus according to the second embodiment are the same as those in the first embodiment, and the configuration of the wavelength conversion element differs from that in the first embodiment. No overall description of the projector and the light source apparatus will therefore be made.

Figure 5:
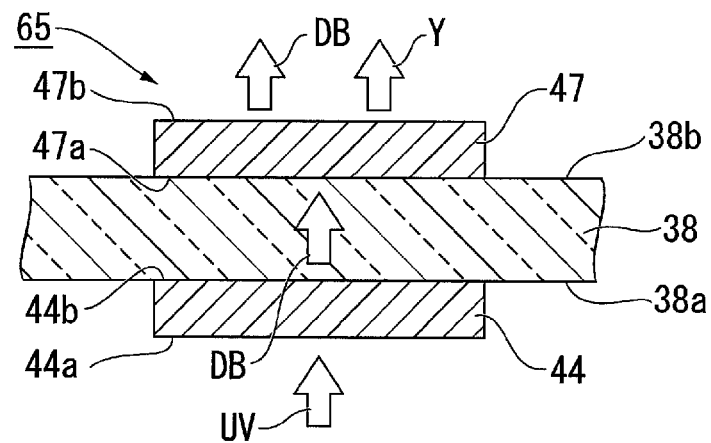
FIG. 5 is a cross-sectional view of a wavelength conversion element according to a second embodiment.

FIG. 5 is a cross-sectional view of a wavelength conversion element according to the second embodiment. The cross-sectional view corresponds to the cross section taken along the line IV-IV in FIG. 3.

In FIG. 5, components common to those in the drawings used in the first embodiment have the same reference characters and will not be described.

A wavelength conversion element 65 according to the present embodiment includes the substrate 38, a first phosphor layer 44, and a second phosphor layer 47, as shown in FIG. 5.

The first phosphor layer 44 has a first light incident surface 44a, on which ultraviolet light UV (excitation light), which belongs to a first wavelength band, is incident and a first light exiting surface 44b, through which first fluorescence DB, which belongs to a second wavelength band different from the first wavelength band is emitted. The first phosphor layer 44 is so provided that the first light exiting surface 44b faces the first surface 38a of the substrate 38. In the present embodiment, the first wavelength band ranges, for example, from about 360 to 400 nm. The second wavelength band ranges, for example, from about 460 to 465 nm and has a peak wavelength of 462 nm, and the first fluorescence DB emitted from the first phosphor layer 44 is blue light.

The first phosphor layer 44 is formed of a blue phosphor material, for example, $Sr_{10}(PO_4)_6Cl_2$:Eu or $(Sr, Ba, Ca)_{10}(PO_4)_6Cl_2$:Eu, in which Eu is dispersed as an activator.

The second phosphor layer 47 emits second fluorescence Y, which belongs to a third wavelength band different from the first and second wavelength bands. The second phosphor layer 47 has a second light incident surface 47a, on which at least the first fluorescence DB is incident. In the present embodiment, the second phosphor layer 47 has the second light incident surface 47a, on which the first fluorescence DB are incident, and a second light exiting surface 47b, through which the first fluorescence DB and the second fluorescence Y are emitted. The second phosphor layer 47 is so provided that the second light incident surface 47a faces the second surface 38b of the substrate 38. In the present embodiment, the third wavelength band ranges, for example, from about 480 to 700 nm, and the second fluorescence Y emitted from the second phosphor layer 47 is yellow light.

The second phosphor layer 47 is formed, for example, of a YAG-based phosphor made of $(Y_{1-x}, Gd_x)_3(Al, Ga)_5O_{12}$ ($0 \leq x \leq 1$), in which Ce is dispersed as an activator (Ce:YAG), as the first phosphor layer 41 in the first embodiment. The second phosphor layer 47 may instead be made of a phosphor material having a wavelength conversion efficiency higher than the wavelength conversion efficiency of the phosphor material used to form the first phosphor layer 41 in a case where the second phosphor layer 47 is excited with the first fluorescence DB having the peak wavelength of 462 nm.

The amount of second fluorescence Y emitted from the second phosphor layer 47 is greater than the amount of first fluorescence DB emitted from the first phosphor layer 44.

In the wavelength conversion element 65, part of the ultraviolet light UV having entered the first phosphor layer 44 as the excitation light is converted in terms of wavelength by the first phosphor layer 44 into the first fluorescence DB. The first fluorescence DB thus exits out of the first phosphor layer 44. The remainder of the ultraviolet light UV may exit along with the first fluorescence DB out of the first phosphor layer 44. Part of the first fluorescence DB having entered the second phosphor layer 47 as the excitation light is converted in terms of wavelength by the second phosphor layer 47 into the second fluorescence Y. The remainder of the first fluorescence DB and the second fluorescence Y thus exit out of the second phosphor layer 47.

Also in the wavelength conversion element 65 according to the present embodiment, in which the first phosphor layer 44 is provided on the first surface 38a of the substrate 38 and the second phosphor layer 47 is provided on the second surface 38b of the substrate 38, the heat generated in each of the phosphor layers 44 and 47 is more likely to be transferred to the substrate 38 than in the wavelength conversion element of related art. The thus configured wavelength conversion element 65 can suppress a decrease in the wavelength conversion efficiency in each of the phosphor layers 44 and 47 and can therefore stably emit light having a desired color gamut.

Further, in the wavelength conversion element 65 according to the present embodiment, not only are the phosphor layers 44 and 47 provided on the surfaces 38a and 38b of the substrate 38, respectively, but the first phosphor layer 44 is provided on the first surface 38a of the substrate 38 (side on which first fluorescence DB is incident) and the second phosphor layer 47 is provided on the second surface 38b of the substrate 38 (side via which first fluorescence DB exits), whereby the following actions and effects are provided.

A phosphor layer that emits a relatively large amount of fluorescence generates a larger amount of heat than the heat generated by a phosphor layer that emits a relatively small amount of fluorescence. In the wavelength conversion element 65 according to the present embodiment, in which the amount of second fluorescence Y emitted from the second phosphor layer 47 is greater than the amount of first fluorescence DB emitted from the first phosphor layer 44 in consideration of the white balance of the white light, a larger amount of heat is generated in the vicinity of the second light incident surface 47a of the second phosphor layer 47. Since the second light incident surface 47a of the second phosphor layer 47 is so provided as to face the second surface 38b of the substrate 38, the large amount of heat generated in the vicinity of the second light incident surface 47a of the second phosphor layer 47 is likely to be transferred to the substrate 38. Therefore, the wavelength conversion element 65 according to the present embodiment can suppress a decrease in the overall wavelength conversion efficiency of the two phosphor layers 44 and 47 and stably emit light having a desired color gamut.

In the first embodiment, the blue light B outputted from the light source 10 has the peak wavelength of 455 nm, which is slightly shifted toward the shorter wavelength side in the wavelength region to which the blue light B belongs. As a result, the color gamut provided when the blue light B is used to form white light is undesirably slightly narrow. To avoid the problem, in the wavelength conversion element 65 according to the present embodiment, the first fluorescence DB (blue light) produced in the first phosphor layer 44 has the peak wavelength of 462 nm, which is longer than the wavelength of the blue light B used in the first embodiment. As a result, the configuration in which the first fluorescence DB is used to form white light allows generation of wide-color-gamut white light.

Third Embodiment

A third embodiment of the invention will be described below with reference to FIG. 6.

The configurations of a projector and a light source apparatus according to the third embodiment are the same as those in the first embodiment, and the configuration of the wavelength conversion element differs from that in the first embodiment. No overall description of the projector and the light source apparatus will therefore be made.

Figure 6:
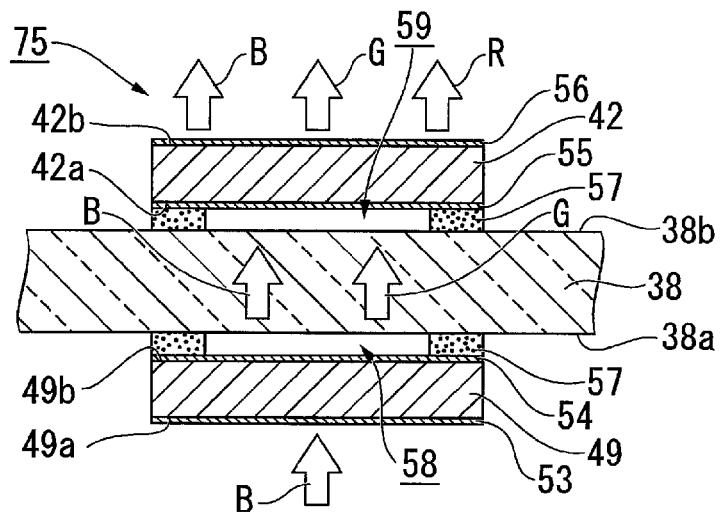
FIG. 6 is a cross-sectional view of a wavelength conversion element according to a third embodiment.

FIG. 6 is a cross-sectional view of a wavelength conversion element according to the third embodiment. The cross-sectional view corresponds to the cross section taken along the line IV-IV in FIG. 3.

In FIG. 6, components common to those in the drawings used in the first embodiment have the same reference characters and will not be described.

A wavelength conversion element 75 according to the present embodiment includes the substrate 38, a first phosphor layer 49, the second phosphor layer 42, a first dichroic layer 53, a second dichroic layer 54, a third dichroic layer 55, a reflection suppression layer 56, bonding layers 57, a first air layer 58, and a second layer 59, as shown in FIG. 6. The second phosphor layer 42 is so provided that the second light incident surface 42a faces the second surface 38b of the substrate 38.

The first phosphor layer 49 has a first light incident surface 49a, on which the blue light B (excitation light), which belongs to the first wavelength band, is incident and a first light exiting surface 49b, through which first fluorescence G, which belongs to a second wavelength band different from the first wavelength band, and the blue light B that has not been used to excite the first phosphor layer 49 exit. The first phosphor layer 49 is so provided that the first light exiting surface 49b faces the first surface 38a of the substrate 38. In the present embodiment, the second wavelength band to which the first fluorescence G belongs ranges, for example, from about 500 to 570 nm (peak wavelength is about 535 nm), and the first fluorescence G emitted from the first phosphor layer 49 is green light.

The first phosphor layer 49 is formed, for example, of an $Lu_3Al_5O_{12}:Ce^{3+}$-based phosphor, a $Y_3O_4:Eu^{2+}$-based phosphor, a $(Ba, Sr)_2SiO_4:Eu^{2+}$-based phosphor, $Ba_3Si_6O_{12}N_2:Eu^{2+}$-based phosphor, an $(Si, Al)_6(O,N)_8:Eu^{2+}$-based phosphor, or any other green phosphor material.

The first dichroic layer 53 is provided on the first light incident surface 49a of the first phosphor layer 49. The first dichroic layer 53 has wavelength selectivity of transmitting light that belongs to the blue color gamut and reflects light that belongs to the green color gamut. The first dichroic layer 53 therefore transmits the blue light B and reflects the first fluorescence G generated in the first phosphor layer 49. The first fluorescence G thus does not exit through the first light incident surface 49a.

The second dichroic layer 54 is provided on the first light exiting surface 49b of the first phosphor layer 49. The second dichroic layer 54 has wavelength selectivity of transmitting light that belongs to the blue color gamut and light that belongs to the green color gamut. The second dichroic layer 54 therefore transmits the blue light B and the first fluorescence G generated in the first phosphor layer 49.

The third dichroic layer 55 is provided on the second light incident surface 42a of the second phosphor layer 42. The third dichroic layer 55 has wavelength selectivity of transmitting light that belongs to the blue color gamut and the green color gamut, and reflects light that belongs to the red color gamut. The third dichroic layer 55 therefore transmits the blue light B and reflects the first fluorescence G and reflects the second fluorescence R produced in the second phosphor layer 42. The second fluorescence R thus does not exit through the second light incident surface 42a.

The reflection suppression layer 56 is provided on the second light exiting surface 42b of the second phosphor layer 42. The reflection suppression layer 56 therefore transmits the entire light incident on the second light exiting surface 42b of the second phosphor layer 42 and causes the light to exit out of the second phosphor layer 42 toward the pickup system 60. In the present embodiment, white light formed of the blue light B that has not been used to excite the first phosphor layer 49 or the second phosphor layer 42, the first fluorescence G (green light) produced in the first phosphor layer 49, and the second fluorescence R (red light) produced in the second phosphor layer 42 exits out of the wavelength conversion element 75.

The first phosphor layer 49 is so attached to the substrate 38 via the bonding layers 57 provided along inner and outer circumferential portions of the first phosphor layer 49 that the first light exiting surface 49b faces the first surface 38a. The configuration described above provides the first air layer 58 between the first light exiting surface 49b of the first phosphor layer 49 and the first surface 38a of the substrate 38. The thickness of the first air layer 58 is therefore roughly equal to the thickness of the bonding layers 57 and is, for example, about 5 μm or smaller.

Similarly, the second phosphor layer 42 is so attached to the substrate 38 via the bonding layers 57 provided along inner and outer circumferential portions of the second phosphor layer 42 that the second light incident surface 42a faces the second surface 38b. The configuration described above provides the second air layer 59 between the second light incident surface 42a of the second phosphor layer 42 and the second surface 38b of the substrate 38. The thickness of the second air layer 59 is therefore roughly equal to the thickness of the bonding layers 57 and is, for example, about 5 μm or smaller.

The other configurations of the wavelength conversion element 75 are the same as those in the first embodiment.

Therefore, the wavelength conversion element 75 according to the present embodiment can provide the same effects provided by the first embodiment, that is, can suppress a decrease in the overall wavelength conversion efficiency of the two phosphor layers 49 and 42 and stably emit white light having a desired color gamut.

In the present embodiment, the air layers 58 and 59 are provided between the phosphor layers 49, 42 and the substrate, respectively, and the phosphor layer 49 or 42 is therefore not in direct contact with the substrate 38. However, since the air layers 58 and 59 each have a very small thickness of, for example, about 5 μm or smaller, the air layer 58 or 59 does not prevent the heat transfer, and the heat generated in the phosphor layers 49 and 42 is transferred to the substrate 38.

In the present embodiment, providing the first air layer 58 provides the following effect.

Out of the first fluorescence G, which is produced in the first phosphor layer 49 and travels toward the substrate 38, the first fluorescence G incident on the first light exiting surface 49b at angles of incidence smaller than the critical angle associated with the first light exiting surface 49b passes through the first light exiting surface 49b, and the first fluorescence G incident on the first light exiting surface 49b at angles of incidence greater than or equal to the critical angle is reflected off the first light exiting surface 49b. In the configuration of the present embodiment, in which the first air layer 58 is provided between the first phosphor layer 49 and the substrate 38, the difference in the refractive index at the interface between the first phosphor layer 49 and a member located on the light exiting side thereof (first air layer 58 or substrate 38) is greater than the difference in a case where no first air layer 58 is provided, and the critical angle increases accordingly. As a result, the amount of first fluorescence G passing through the first light exiting surface 49b increases, whereby the amount of first fluorescence G emitted from the first phosphor layer 49 can be increased.

Similarly, in the present embodiment, providing the second air layer 59 provides the following effect.

Out of the blue light B and the first fluorescence G, which are incident on the second light incident surface 42a of the second phosphor layer 42, the blue light B and the first fluorescence G incident on the second light incident surface 42a at angles of incidence smaller than the critical angle associated with the second light incident surface 42a pass through the second light incident surface 42a and enter the second phosphor layer 42, and the blue light B and the first fluorescence G incident on the second light incident surface 42a at angles of incidence greater than or equal to the critical angle are reflected off the second light incident surface 42a. In the configuration of the present embodiment, in which the second air layer 59 is provided between the second phosphor layer 42 and the substrate 38, the difference in the refractive index at the interface between the second phosphor layer 42 and a member located on the light incident side thereof (second air layer 59 or substrate 38) is greater than the difference in a case where no second air layer 59 is provided, and the critical angle increases accordingly. As a result, the amount of blue light B and first fluorescence G passing through the second light incident surface 42a increases, whereby the amount of blue light B and first fluorescence G that enter the second phosphor layer 42 can be increased.

The technical range of the invention is not limited to the embodiments described above, and a variety of changes can be made thereto to the extent that the changes do not depart from the substance of the invention.

For example, the wavelength conversion element according to the first embodiment includes the first phosphor layer that emits yellow first fluorescence and the second phosphor layer that emits red second fluorescence, but the combination of the emitted light colors from the phosphor layers is not limited to yellow and red. For example, the wavelength conversion element may instead include, for example, a first phosphor layer that emits green first fluorescence and a second phosphor layer that emits red second fluorescence.

Further, the light outputted from the wavelength conversion element is not necessarily white light. In this case, for example, the wavelength conversion element may include, for example, a first phosphor layer that emits blue first fluorescence and a second phosphor layer that emits red second fluorescence or a first phosphor layer that emits blue first fluorescence and a second phosphor layer that emits green second fluorescence.

The first and second surfaces of the substrate corresponding to the light transmitting portion may each have a light diffusing surface that diffuses the excitation light, the first fluorescence, or the second fluorescence. According to the configuration described above, in a case where the light emission distribution of the excitation light (blue light, for example) differs from the light emission distribution of the first fluorescence (yellow light, for example) or the second fluorescence (red light, for example), the light diffusing surface can diffuse the excitation light, the first fluorescence, or the second fluorescence in such a way that the light emission distribution of the excitation light approaches the light emission distribution of the first fluorescence or the second fluorescence. A projector capable of displaying a wide-color-gamut image with color unevenness suppressed can thus be provided.

For example, the third embodiment has been described with reference to the case where any of the dichroic layers and the reflection suppression layer is provided on each of the light incident surface and the light exiting surface of each of the first and second phosphor layers. Dichroic layers and a reflection suppression layer of this type may also be used in the wavelength conversion elements according to the first and second embodiments.

In addition to the above, the specific descriptions of the shape, the number, the arrangement, the material, and other factors of the components of the wavelength converter, the illuminator, and the projector are not limited to those in the embodiments described above and can be changed as appropriate. The above embodiments have been described with reference to the case where the illuminator according to each of the embodiments of the invention is incorporated in a projector using liquid crystal light valves, but not necessarily. The illuminator may be incorporated in a projector using a digital micromirror device as each of the light modulators.

The above embodiments have been described with reference to the case where the illuminator according to each of the embodiments of the invention is incorporated in a projector, but not necessarily. The illuminator according to each of the embodiments of the invention may be used as a lighting apparatus, a headlight of an automobile, and other components.

The entire disclosure of Japanese Patent Application No. 2018-059826, filed on Mar. 27, 2018 is expressly incorporated by reference herein.

What is claimed is:

1. A wavelength conversion element comprising:
a first wavelength conversion layer that has a first light incident surface on which excitation light that belongs to a first wavelength band is incident and a first light exiting surface facing away from the first light incident surface and emits first fluorescence that belongs to a second wavelength band different from the first wavelength band;

a second wavelength conversion layer that has a second light incident surface on which at least the first fluorescence is incident and emits second fluorescence that belongs to a third wavelength band different from the first and second wavelength bands; and a substrate that has a first surface and a second surface facing away from the first surface and includes a light transmitting portion that transmits at least the first fluorescence, the first wavelength conversion layer is so provided that the first light exiting surface faces the first surface of the substrate, and the second wavelength conversion layer is so provided that the second light incident surface faces the second surface of the substrate.

2. The wavelength conversion element according to claim 1, wherein a wavelength conversion efficiency of the second wavelength conversion layer is lower than a wavelength conversion efficiency of the first wavelength conversion layer.

3. The wavelength conversion element according to claim 1, wherein an amount of the second fluorescence emitted from the second wavelength conversion layer is greater than an amount of the first fluorescence emitted from the first wavelength conversion layer.

4. The wavelength conversion element according to claim 1, wherein a first air layer is provided between the first light exiting surface of the first wavelength conversion layer and the first surface of the substrate.

5. The wavelength conversion element according to claim 1, wherein a second air layer is provided between the second light incident surface of the second wavelength conversion layer and the second surface of the substrate.

6. A light source apparatus comprising:
the wavelength conversion element according to claim 1; and
a light source that outputs the excitation light toward the wavelength conversion element.

7. A light source apparatus comprising:
the wavelength conversion element according to claim 2; and
a light source that outputs the excitation light toward the wavelength conversion element.

8. A light source apparatus comprising:
the wavelength conversion element according to claim 3; and
a light source that outputs the excitation light toward the wavelength conversion element.

9. A light source apparatus comprising:
the wavelength conversion element according to claim 4; and
a light source that outputs the excitation light toward the wavelength conversion element.

10. A light source apparatus comprising:
the wavelength conversion element according to claim 5; and
a light source that outputs the excitation light toward the wavelength conversion element.

11. A projector comprising:
the light source apparatus according to claim 6;
a light modulator that modulates light from the light source apparatus in accordance with image information to form image light; and
a projection optical apparatus that projects the image light.

12. A projector comprising:
the light source apparatus according to claim 7;
a light modulator that modulates light from the light source apparatus in accordance with image information to form image light; and
a projection optical apparatus that projects the image light.

13. A projector comprising:
the light source apparatus according to claim 8;
a light modulator that modulates light from the light source apparatus in accordance with image information to form image light; and
a projection optical apparatus that projects the image light.

14. A projector comprising:
the light source apparatus according to claim 9;
a light modulator that modulates light from the light source apparatus in accordance with image information to form image light; and
a projection optical apparatus that projects the image light.

15. A projector comprising:
the light source apparatus according to claim 10;
a light modulator that modulates light from the light source apparatus in accordance with image information to form image light; and
a projection optical apparatus that projects the image light.

16. The projector according to claim 11, wherein the first or second surface of the substrate corresponding to the light transmitting portion has a light diffusing surface that diffuses the excitation light, the first fluorescence, or the second fluorescence.

17. The projector according to claim 12, wherein the first or second surface of the substrate corresponding to the light transmitting portion has a light diffusing surface that diffuses the excitation light, the first fluorescence, or the second fluorescence.

18. The projector according to claim 13, wherein the first or second surface of the substrate corresponding to the light transmitting portion has a light diffusing surface that diffuses the excitation light, the first fluorescence, or the second fluorescence.

19. The projector according to claim 14, wherein the first or second surface of the substrate corresponding to the light transmitting portion has a light diffusing surface that diffuses the excitation light, the first fluorescence, or the second fluorescence.

20. The projector according to claim 15, wherein the first or second surface of the substrate corresponding to the light transmitting portion has a light diffusing surface that diffuses the excitation light, the first fluorescence, or the second fluorescence.

* * * * *